United States Patent
Marutani et al.

(10) Patent No.: US 8,651,082 B2
(45) Date of Patent: Feb. 18, 2014

(54) PREMIXED COMPRESSION IGNITION DIESEL ENGINE

(75) Inventors: Youichi Marutani, Tokyo (JP); Yasunori Ashikaga, Tokyo (JP); Mamoru Kurashina, Matsumoto (JP)

(73) Assignee: IHI Corporation, Tokyo (JP)

( * ) Notice: Subject to any disclaimer, the term of this patent is extended or adjusted under 35 U.S.C. 154(b) by 917 days.

(21) Appl. No.: 12/808,546

(22) PCT Filed: Nov. 5, 2008

(86) PCT No.: PCT/JP2008/003179
§ 371 (c)(1),
(2), (4) Date: Jun. 16, 2010

(87) PCT Pub. No.: WO2009/078120
PCT Pub. Date: Jun. 25, 2009

(65) Prior Publication Data
US 2010/0263624 A1    Oct. 21, 2010

(30) Foreign Application Priority Data

Dec. 17, 2007 (JP) ................................. 2007 324647

(51) Int. Cl.
*F02F 1/42* (2006.01)
(52) U.S. Cl.
USPC .................................................... 123/188.14
(58) Field of Classification Search
USPC ............... 123/184.21–184.59, 188.14, 188.3, 123/188.7, 261, 295, 301, 306, 468, 590
See application file for complete search history.

(56) References Cited

U.S. PATENT DOCUMENTS

| 2,884,918 | A | | 5/1959 | Klug |
| 4,852,526 | A | * | 8/1989 | Brown ...................... 123/184.42 |
| 6,848,408 | B1 | * | 2/2005 | Mendler .................. 123/184.21 |
| 8,468,834 | B2 | * | 6/2013 | Khosla et al. ................... 60/742 |
| 2006/0191260 | A1 | * | 8/2006 | Meyer ............................. 60/320 |

FOREIGN PATENT DOCUMENTS

| DE | 408 383 | 1/1925 |
| DE | 197 40 229 A1 | 3/1999 |
| JP | 36-1802 | 3/1961 |
| JP | 57-30359 | 2/1982 |
| JP | 1-160172 | 11/1989 |
| JP | 2003-13826 | 1/2003 |
| JP | 2004-346882 | 12/2004 |
| JP | 2007-24001 | 2/2007 |

OTHER PUBLICATIONS

Extended European Search Report issued Jul. 4, 2011, in European Patent Application No. 08860871.6.

* cited by examiner

*Primary Examiner* — Stephen K Cronin
*Assistant Examiner* — Sizo Vilakazi
(74) *Attorney, Agent, or Firm* — Oblon, Spivak, McClelland, Maier & Neustadt, L.L.P.

(57) ABSTRACT

In a premixed compression ignition diesel engine 1 with fuel being injected midway of a intake passage 15, an intake port 6 is formed with an orifice 10 which is throttled in passage cross-sectional area at least in an opening operation of an intake valve 7. This prevents adhesion of the fuel to an inner wall of the intake passage and promotes atomization of the fuel. A combustion chamber is fed with the sufficiently atomized fuel, which prevents combustion failure in the combustion chamber to attain reduction of particulate matters.

2 Claims, 3 Drawing Sheets

PREMIXED COMPRESSION IGNITION DIESEL ENGINE

TECHNICAL FIELD

The present invention relates to a premixed compression ignition diesel engine.

BACKGROUND ART

In general, a diesel engine as internal combustion engine employs not plug spark ignition like a gasoline engine but natural ignition through direct injection of light oil as fuel into air which has been high-temperatured through high compression.

For a diesel engine, attention is recently paid to a so-called premixed compression ignition strategy for injection of fuel at high pressure and before a top dead center of a piston stroke so as to premix the fuel with air, the fuel-air mixture being compressed into high temperature to cause autoignition and combustion in a single burst.

In order to implement the premixed compression ignition strategy, a diesel engine with fuel such as light oil being injected midway of an intake passage is being developed.

State-of-the-art technology for a premixed compression ignition engine with fuel being injected midway of an intake passage is disclosed, for example, in Patent Literature 1.

Patent Literature 1: JP 2007-24001A

SUMMARY OF INVENTION

Technical Problems

However, the above-mentioned injection of the fuel such as light oil inferior in evaporation characteristics to gasoline midway of an intake passage may bring about adhesion of the oil to an inner wall of the intake passage. The adherent fuel directly flows into a combustion chamber in a cylinder, so that the combustion chamber is fed with the insufficiently atomized fuel, resulting in possible combustion failure in the combustion chamber and thus production of a lot of particulates (particulate matters), which requires improvement.

The invention was made in view of the above and has its object to provide a premixed compression ignition diesel engine capable of preventing fuel from adhering to an inner wall of an intake passage while promoting atomization thereof, feeding sufficiently atomized fuel to a combustion chamber and preventing combustion failure in the combustion chamber to attain reduction of particulates.

Solution to Problems

The invention is directed to a premixed compression ignition diesel engine with fuel being injected midway of an intake passage, comprising an orifice formed in an intake port which is throttled in passage cross-section area at least in an opening operation of an intake valve.

According to the above-mentioned means, the following actions may be acquired.

With the above-mentioned construction, when fuel such as light oil is injected midway of the intake passage and even if the fuel such as light oil adheres to the inner wall of the intake passage, the adherent oil does not directly flow into the combustion chamber in the cylinder and is atomized by the fuel-air mixture with a flow rate increased when passing through the orifice formed in the intake port; as a result, the combustion chamber is fed with the sufficiently atomized fuel, resulting in less possible combustion failure in the combustion chamber to attain reduction of particulates.

In the premixed compression ignition diesel engine, the orifice may comprise a thick portion swellingly formed on an interior of the intake port at a location surrounding a valve stem of an intake valve and a large-diameter portion formed on the valve stem so as to face the thick portion at least in an opening operation of the intake valve.

In this case, the thick portion of the orifice may be provided with a fuel injecting means which injects fuel into the intake port. This causes the fuel to be sucked from the fuel injecting means into the intake port due to the ejector effect, so that there is no necessity of providing a special fuel injection nozzle or the like midway of the intake passage; with the simple construction, the fuel may be prevented from adhering to the inner wall of the intake passage and the atomization thereof may be promoted.

The fuel injecting means may comprise injection ports opened at a plurality of positions circumferentially of the thick portion.

The fuel injecting means may comprise an annular injection slot opened throughout the circumference of the thick portion.

The fuel injecting means may comprise a porous sintered metal ring member attached to the thick portion.

Advantageous Effects of Invention

A premixed compression ignition diesel engine according to the invention can have meritorious effects that fuel is prevented from adhering to an inner wall of an intake passage while promoting atomization thereof, that sufficiently atomized fuel is fed into a combustion chamber and that combustion failure in the combustion chamber is prevented to attain reduction of particulates.

Figure 1:
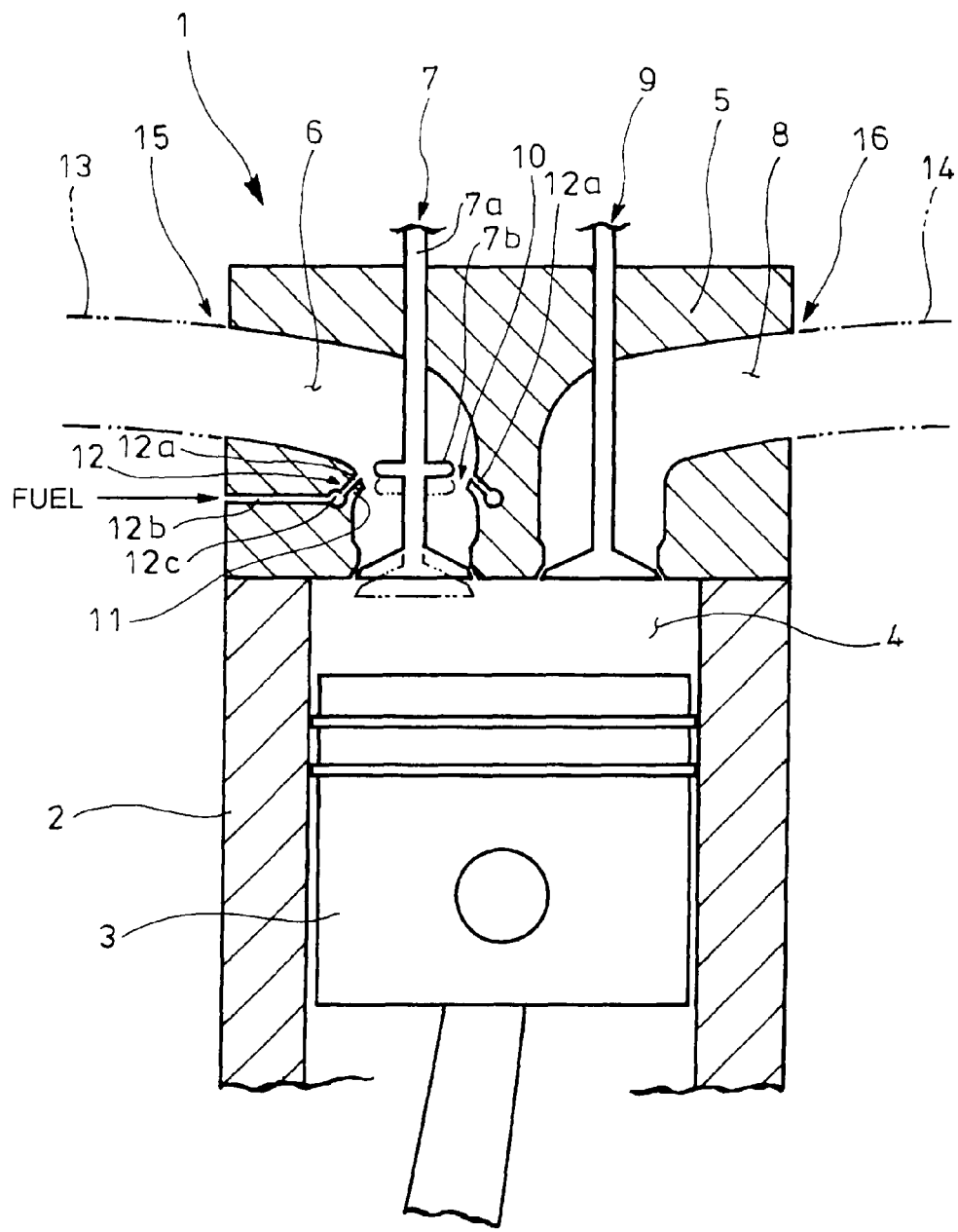
FIG. 1 is a schematic section of a first embodiment of the invention.

REFERENCE SIGNS LIST 1. diesel engine
2. cylinder
3. piston
4. combustion chamber
5. cylinder head
6. intake port
7. intake valve
7a. valve stem
7b. large-diameter portion
10. orifice
11. thick portion
12. fuel injecting means
12a. injection port
12b. fuel feed port
12c. annular fuel header passage
12d. annular injection slot
12e. porous sintered metal ring member
13. intake pipe
15. intake passage

DESCRIPTION OF EMBODIMENTS

Embodiments of the invention will be described with reference to the drawings.

FIG. 1 shows a first embodiment of the invention in which reference numeral 1 denotes a diesel engine; 2, a cylinder in the diesel engine 1; 3, a piston slidably inserted in the cylinder 2; 4, a combustion chamber formed at a top of the piston 3 in the cylinder 2; 5, a cylinder head on an upper portion of the cylinder 2; 6, an intake port formed in the cylinder head 5; 7, an intake valve which opens/closes the intake port 6; 8, an exhaust port formed in the cylinder head 5; and 9, an exhaust valve which opens/closes the exhaust port 8. The intake port 6 is formed with an orifice 10 which is throttled in passage cross-section area at least in an opening operation of the intake valve 7. The orifice 10 comprises a thick portion 11 swellingly formed on an interior of the intake port 6 at a location surrounding a valve stem 7a of the intake valve 7 and a large-diameter portion 7b formed on the valve stem 7a so as to face the thick portion 11 at least in an opening operation of the intake valve 7. The thick portion 11 of the orifice 10 is provided with fuel injecting means 12 which injects fuel into the intake port 6.

In the first embodiment, the fuel injecting means 12 comprises injection ports 12a opened at a plurality of positions (e.g., on the order of three to eight positions) circumferentially of the thick portion 11. The fuel injection ports 12a are fed with fuel from a fuel feed port 12b through an annular fuel header passage 12c.

In the figure, reference numeral 13 designates an intake pipe connected to the intake port 6; and 14, an exhaust pipe connected to the exhaust port 8. The intake pipe 13 and the intake port 6 provide an intake passage 15; and the exhaust pipe 14 and the exhaust port 8 provides an exhaust passage 16.

A mode of operation of the first embodiment will be described.

When the intake valve 7 is opened as indicated by imaginary lines from a state shown by a solid line in FIG. 1, intake air is sucked from the intake pipe 13 and the intake port 6 of the intake passage 15 into the combustion chamber 4. Feeding of fuel such as light oil at this timing from the fuel feed port 12b of the fuel injecting means 12 through the annular fuel header passage 12c to the injection ports 12a brings about suction of the fuel from the injection ports 12a to the orifice 10 in the intake port 6 due to an ejector effect and causes the fuel to be atomized by the intake air with a flow rate increased when passing through the orifice 10. As a result, the combustion chamber 4 is fed with the sufficiently atomized fuel, resulting in less possible combustion failure in the combustion chamber 4 to attain reduction of particulates.

Moreover, in the first embodiment, since the thick portion 11 of the orifice 10 is provided with the injection ports 12a for injection of fuel into the intake port 6, the fuel is sucked into the intake port 6 from the injection ports 12a due to the ejector effect, so that there is no necessity of arranging a special fuel injection nozzle or the like midway of the intake passage 15. Thus, with the simple construction, the fuel may be prevented from adhering to the inner wall of the intake passage 15 while promoting atomization thereof.

Thus, the fuel may be prevented from adhering to the inner wall of the intake passage 15 while the atomization thereof may be promoted; as a result, the combustion chamber 4 may be fed with the sufficiently atomized fuel and combustion failure in the combustion chamber 4 may be prevented to attain reduction of particulates.

Figure 2:
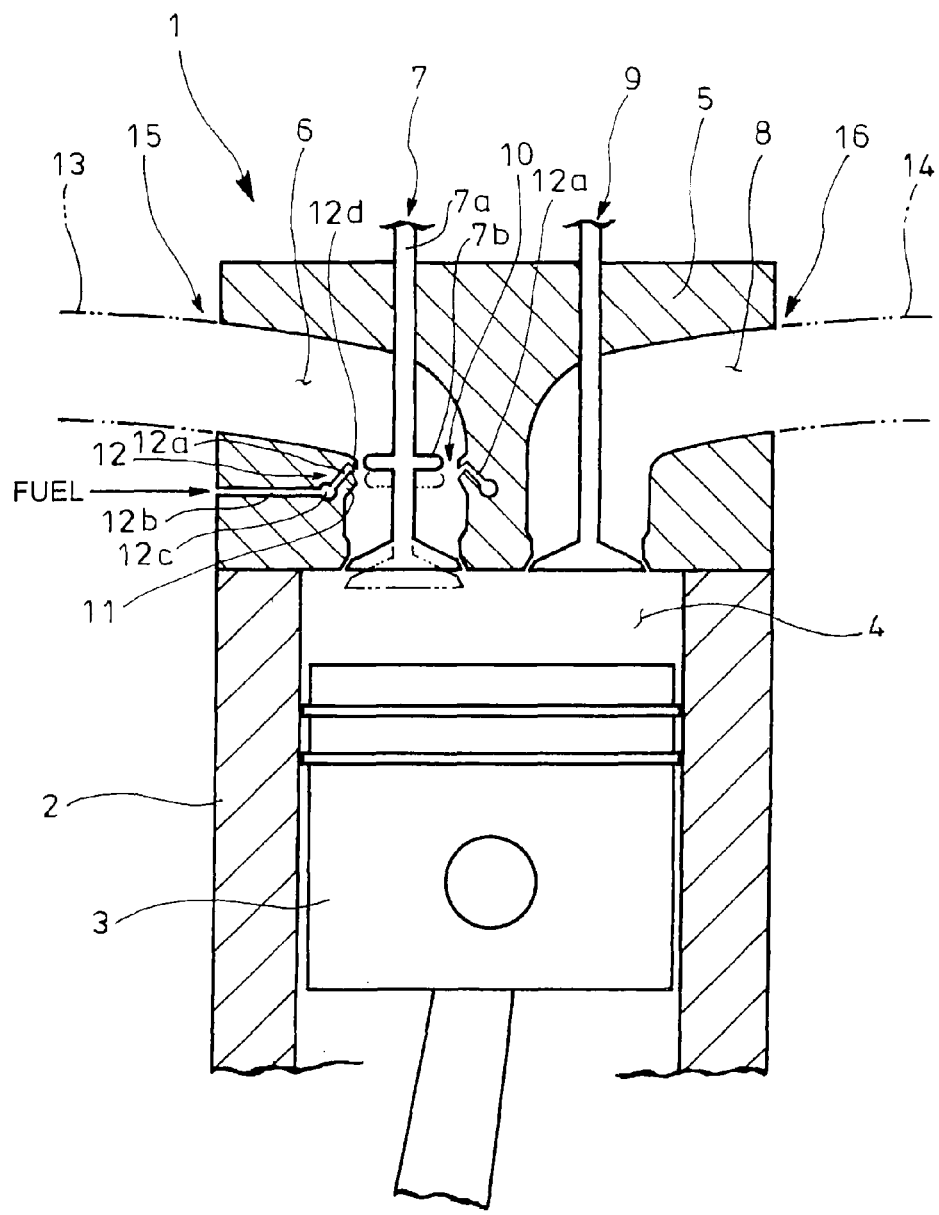
FIG. 2 is a schematic section of a second embodiment of the invention.

FIG. 2 shows a second embodiment of the invention in which parts similar to those in FIG. 1 are represented by the same reference numerals. Although its basic construction is equivalent to that shown in FIG. 1, the second embodiment is characteristic in that the fuel injecting means 12 comprises an annular injection slot 12d opened throughout the circumference of the thick portion 11, fuel being fed to the annular injection slot 12d from the fuel feed port 12b through the annular fuel header passage 12c and the injection port 12a as shown in FIG. 2.

In the embodiment shown in FIG. 2, when the intake valve 7 is opened as indicated by imaginary lines from a state shown by a solid line, intake air is sucked from the intake pipe 13 and the intake port 6 of the intake passage 15 into the combustion chamber 4. Feeding of fuel such as light oil at this timing from the fuel feed port 12b of the fuel injecting means 12 through the annular fuel header passage 12c and the injection ports 12a to the annular injection slot 12d brings about suction of the fuel from the annular injection slot 12d to the orifice 10 in the intake port 6 due to the ejector effect and causes the fuel to be atomized by the intake air with a flow rate increased when passing through the orifice 10. As a result, the combustion chamber 4 is fed with the sufficiently atomized fuel, resulting in less possible combustion failure in the combustion chamber 4 to attain reduction of particulates.

Moreover, in the second embodiment, since the thick portion 11 of the orifice 10 is provided with the annular injection slot 12d for injection of fuel into the intake port 6, the fuel is sucked into the intake port 6 from the annular injection slot 12d due to the ejector effect, so that there is no necessity of arranging a special fuel injection nozzle or the like midway of the intake passage 15. Thus, with the simple construction, the fuel may be prevented from adhering to the inner wall of the intake passage 15 while atomization thereof may be promoted.

Thus, also in the embodiment shown in FIG. 2, the fuel may be prevented from adhering to the inner wall of the intake passage 15 while the atomization thereof may be promoted; as a result, the combustion chamber 4 may be fed with the sufficiently atomized fuel and combustion failure in the combustion chamber 4 may be prevented to attain reduction of particulates as in the case of the embodiment shown in FIG. 1.

Figure 3:
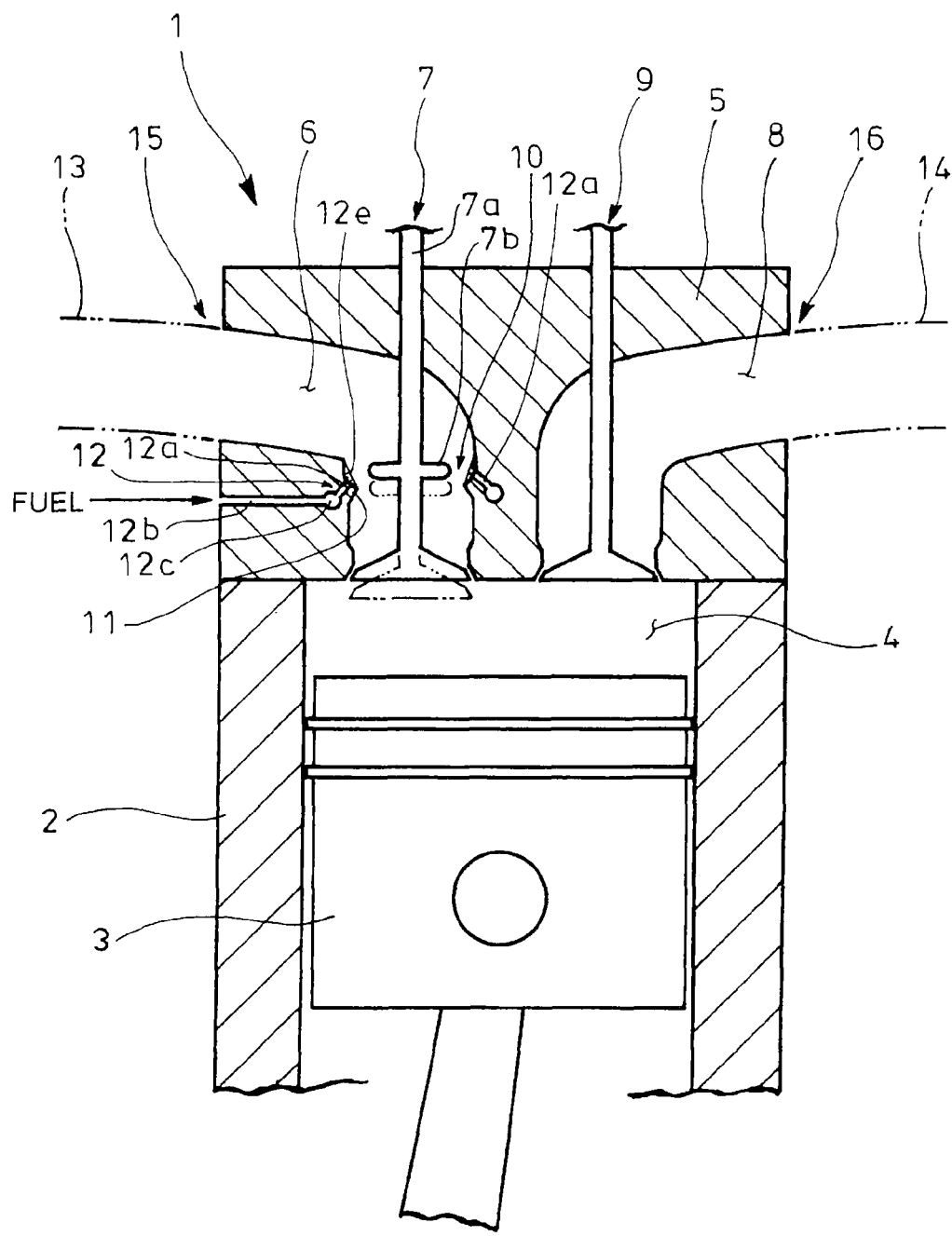
FIG. 3 is a schematic section of a third embodiment of the invention.

FIG. 3 shows a third embodiment of the invention in which parts similar to those in FIG. 1 are represented by the same reference numerals. Although its basic construction is equivalent to that depicted in FIG. 1, the third embodiment is characteristic in that the fuel injecting means 12 comprises a porous sintered metal ring member 12e attached to the thick portion 11, fuel being fed to the porous sintered metal ring member 12e from the fuel feed port 12b through the annular fuel header passage 12c and the injection ports 12a as shown in FIG. 3.

In the embodiment shown in FIG. 3, when the intake valve 7 is opened as shown by imaginary lines from a state shown by a solid line, intake air is sucked from the intake pipe 13 and the intake port 6 of the intake passage 15 into the combustion chamber 4. Feeding of fuel such as light oil at this timing from the fuel feed port 12b of the fuel injecting means 12 through the annular fuel header passage 12c and the injection ports 12a to the porous sintered metal ring member 12e brings about suction of the fuel from the porous sintered metal ring member 12e to the orifice 10 in the intake port 6 in a leaching manner due to the ejector effect and causes the fuel to be atomized by the intake air with a flow rate increased when passing through the orifice 10. As a result, the combustion chamber 4 is fed with the sufficiently atomized fuel, resulting in less possible combustion failure in the combustion chamber 4 to attain reduction of particulates.

Moreover, in the third embodiment, since the thick portion 11 of the orifice 10 is provided with the porous sintered metal ring member 12e for injection of fuel into the intake port 6 in a leaching manner, the fuel is sucked into the intake port 6 from the annular injection slot 12d due to the ejector effect, so that there is no necessity of arranging a special fuel injection nozzle or the like midway of the intake passage 15. Thus, with the simple construction, the fuel may be prevented from adhering to the inner wall of the intake passage 15 while atomization thereof may be promoted.

Thus, also in the embodiment depicted in FIG. 3, the fuel may be prevented from adhering to the inner wall of the intake passage 15 while the atomization thereof may be promoted; as a result, the combustion chamber 4 may be fed with the sufficiently atomized fuel and combustion failure in the combustion chamber 4 may be prevented to attain reduction of particulates as in the case of the embodiments shown in FIGS. 1 and 2.

Although the fuel injecting means 12 is provided on the thick portion 11 of the orifice 10 in all of the three embodiments, the fuel injecting means 12 may be provided midway of the intake pipe 13 or at a required location of the intake port 6 constituting the intake passage 15 instead. When the injection is performed midway of the intake passage 15 with the fuel injecting means 12 provided midway of the intake pipe 13 or at a required location of the intake port 6 constituting the intake passage 15 and even if the fuel such as light oil adheres to the inner wall of the intake passage 15, the adherent oil does not directly flow into the combustion chamber 4 in the cylinder and is atomized by a fuel-air mixture with a flow rate increased when passing through the orifice 10 formed in the intake port 6; as a result, the combustion chamber 4 is fed with the sufficiently atomized fuel, resulting in less combustion failure in the combustion chamber 4 to attain reduction of particulates.

It is to be understood that a premixed compression ignition diesel engine according to the invention is not limited to the above embodiments and that various changes and modifications may be made without departing from the scope of the invention.

The invention claimed is:

1. A premixed compression ignition diesel engine with fuel being injected midway of an intake passage, comprising an orifice formed in an intake port which is throttled in passage cross-section area at least in an opening operation of an intake valve,
wherein said orifice comprises a thick portion swellingly formed on an interior of the intake port at a location surrounding a valve stem of the intake valve and a large-diameter portion formed on said valve stem so as to face said thick portion at least in an opening operation of said intake valve,
said thick portion of said orifice is provided with fuel injection means which injects fuel into the intake port, and
said fuel injection means comprises injection ports at a plurality of positions circumferentially of the thick portion.

2. A premixed compression ignition diesel engine with fuel being injected midway of an intake passage, comprising an orifice formed in an intake port which is throttled in passage cross-section area at least in an opening operation of an intake valve,
wherein said orifice comprises a thick portion swellingly formed on an interior of the intake port at a location surrounding a valve stem of the intake valve and a large-diameter portion formed on said valve stem so as to face said thick portion at least in an opening operation of said intake valve,
said thick portion of said orifice is provided with fuel injection means which injects fuel into the intake port, and
said fuel injection means comprises a porous sintered metal ring member attached to the thick portion.

* * * * *